United States Patent [19]
Clark et al.

[11] Patent Number: 5,680,383
[45] Date of Patent: Oct. 21, 1997

[54] DATA-TRANSITION THRESHOLD FOLLOWING IN OPTICAL RECORDING

[75] Inventors: Alan Robert Clark; Robert Allen Hutchins; Glen Alan Jaquette, all of Tucson, Ariz.; Ara Sarkis Patapoutian, Westboro, Mass.; Pantas Sutardja, San Jose, Calif.

[73] Assignee: International Business Machines Corporation, Armonk, N.Y.

[21] Appl. No.: 726,307

[22] Filed: Oct. 2, 1996

Related U.S. Application Data

[62] Division of Ser. No. 407,125, Mar. 20, 1995, Pat. No. 5,629,914.

[51] Int. Cl.$^6$ .................................................. G11B 7/00
[52] U.S. Cl. ........................... 369/59; 369/47; 369/124; 360/46
[58] Field of Search .................................. 369/59, 60, 47, 369/48, 49, 50, 54, 58, 124, 32; 360/48, 46, 39

[56] References Cited

U.S. PATENT DOCUMENTS 5,341,249 8/1994 Abbott et al. .......................... 360/46
5,442,492 8/1995 Cunningham et al. ................. 360/46

*Primary Examiner*—Muhammad N. Edun
*Attorney, Agent, or Firm*—Francis A. Sirr; Homer L. Knearl

[57] ABSTRACT

In a pulse width modulated read signal channel for an optical disk drive, a data-transition threshold is maintained for data detection by a threshold tracking circuit that estimates the amplitude centerline data-transition threshold from the most recent maximum and minimum values of the read signal waveform. To improve the accuracy of the response of the centerline estimator, the threshold is increased or decreased based on the phase error at each read signal transition through the data-transition threshold. In addition, defects in the optical recording media are detected, and a defect present signal is used to inhibit the transition phase error input to the centerline estimator. This prevents the estimator from moving the threshold to an incorrect stable level. In addition, the defect present signal boosts the error feedback in the centerline estimator. The estimator then more quickly follows the read signal waveform. As a result, the estimator reacquires the centerline of the waveform after the read head moves past the defect without retriggering the defect detection circuit.

8 Claims, 3 Drawing Sheets

DATA-TRANSITION THRESHOLD FOLLOWING IN OPTICAL RECORDING

This application is a division of application Ser. No. 08/407,125, filed Mar. 20, 1995, U.S. Pat. No. 5,629,914.

CROSS REFERENCE TO RELATED APPLICATION

The present invention is used in the invention described in co-pending, commonly aligned patent application Ser. No. 08/407,124, now U.S. Pat. No. 5,502,711 entitled "Dual Digital Phase Locked Loop Clock Channel For Optical Recording" and filed concurrently herewith. The description of this cross-referenced application is incorporated herein by reference.

BACKGROUND OF THE INVENTION

1. Field of the Invention

This invention relates to creating a read signal centerline estimate to provide a data-transition detection threshold for use with a pulse width modulated signal read from an optical recording. More particularly, the invention relates to tracking the read signal centerline estimate substantially near a mid-point between positive and negative peaks of the read signal. In addition, the invention relates to detecting defects in the optical recording and recovering the data-transition threshold after the defects.

2. Description of Related Art

Pulse width modulated (PWM) data recording is a recording method whereby a signal transition in a bit cell time interval indicates either a binary 1 state or a binary 0 state, whereas the lack of a signal transition in a bit cell time interval indicates the other of the two possible binary states 0 and 1. To decode the PWM read signal from a recording, the read signal must be assigned into bit cell time intervals, and the presence or absence of a signal transition, i.e. data transition, in a bit cell must be detected. The above-identified, cross-referenced application is directed to defining the bit cell time intervals and assigning the read signal transitions to the correct bit cell. The present invention is directed to keeping the data-transition detection threshold within a range for reliable use in detecting read signal data transitions and for making possible for the cross-referenced invention to reliably assign those transitions to the correct bit cell.

The transitions are defined as positive transitions (PTR), where the read signal goes from a low level to a high level, or negative transitions (NTR), where the read signal goes from a high level to a low level. Optimum detection of a transition is accomplished by providing a centerline threshold midway between the low level and the high level of the read signal. Each passage of the read signal through the centerline threshold then defines a transition, PTR or NTR, which generally defines a binary 1 for the bit cell containing the transition.

Data transition detection in PWM optical recording has the great advantage of providing a 6 db improvement in the signal-to-noise ratio over peak detection in PWM optical recording. The problems with PWM recording are the necessity of resynchronizing a clock signal to define the bit cells and the problem of the data-transition threshold drifting away from signal peak-to-peak centerline when there is a defect in the recording media.

A recording media defect might be caused by delamination in the recording medium, an irregularity in the recording surface or dirt on the recording surface. In any case, the result is that the read signal stays at a high or low level for an abnormal period of time which causes the data-transition threshold to drift away from a true centerline halfway between normal positive and negative peaks of the read signal. In some cases, the centerline estimate circuit operating with a data detection circuit may even lock the data-transition threshold onto a false centerline estimate above or below the true centerline.

The first problem of resynchronization is solved by the above-identified cross-referenced application. The second problem of maintaining the data-transition threshold at the true centerline between normal positive and negative peaks of the read signal is solved by the present invention.

SUMMARY OF THE INVENTION

In accordance with this invention, the data-transition threshold is provided by a read signal, centerline estimator circuit that estimates the amplitude centerline between read signal peaks from the amplitude mid-point between the most recent maximum and minimum values of the read signal waveform. The difference between the present data-detection threshold and the amplitude mid-point provides an amplitude mid-point error response in the centerline estimator. This amplitude mid-point error response is used by that centerline estimator to adjust the data-transition threshold so that threshold follows the mid-point between the most recent maximum and minimum value changes in the read signal waveform. However, the adjustment of the threshold based on the amplitude mid-point error can not be set too responsive as the data detector using the data-transition threshold starts to detect noise as data.

To increase the accuracy of the response of the estimator without reducing the signal/noise ratio, the data-transition threshold provided by the centerline estimator is also raised or lowered based on a transition phase error at each read signal transition through the data-transition threshold. The difference in time between the detected transition through the data-transition threshold and the center of the bit cell time interval is the transition phase error. The transition phase error is used to adjust the centerline estimate which, when stored, is the data-transition threshold. The combination of amplitude mid-point error correction and transition phase error correction of the centerline estimate keeps the data-transition threshold very near amplitude centerline of the waveform, and the detected transition very near the center of the bit cell interval.

Unfortunately, defects in the optical recording media can cause the amplitude mid-point of the read signal to move far enough that transition phase error adjustment of the centerline estimate locks the data transition threshold to a wrong level, or value other than the amplitude mid-point of the normal read signal. To prevent the data-transition threshold from locking at a wrong level, the defects are detected and a defect-present signal is used to inhibit the phase error input to the centerline estimator. Without the transition phase error feedback from the data detection circuit, the centerline estimator does not cause the data-transition threshold to lock, or stabilize, at an incorrect level. In addition, the defect-present signal boosts the amplitude mid-point error response in the centerline estimator. The estimator then more quickly follows the amplitude mid-point of the read signal waveform. As a result, the estimator quickly reacquires the amplitude mid-point of a normal read signal waveform after the read head has moved off the defect. The defect-present signal is extended a predetermined time interval after the read head has moved off the defect for the purpose of allowing the centerline estimator to more quickly reacquire the amplitude mid-point of the normal read signal.

The great advantage of the invention is that the data-transition threshold more accurately follows the amplitude mid-point of the read signal without being susceptible to noise. Further, the transition phase error feedback is inhibited during the presence of a defect under the read head to prevent incorrect data-transition threshold values. Also, the centerline estimator's responsiveness to the read signal mid-point errors is set to a higher level for a time interval after the defect is passed so that the data-transition threshold is quickly reacquired.

DETAILED DESCRIPTION OF THE PREFERRED EMBODIMENT

Figure 1:
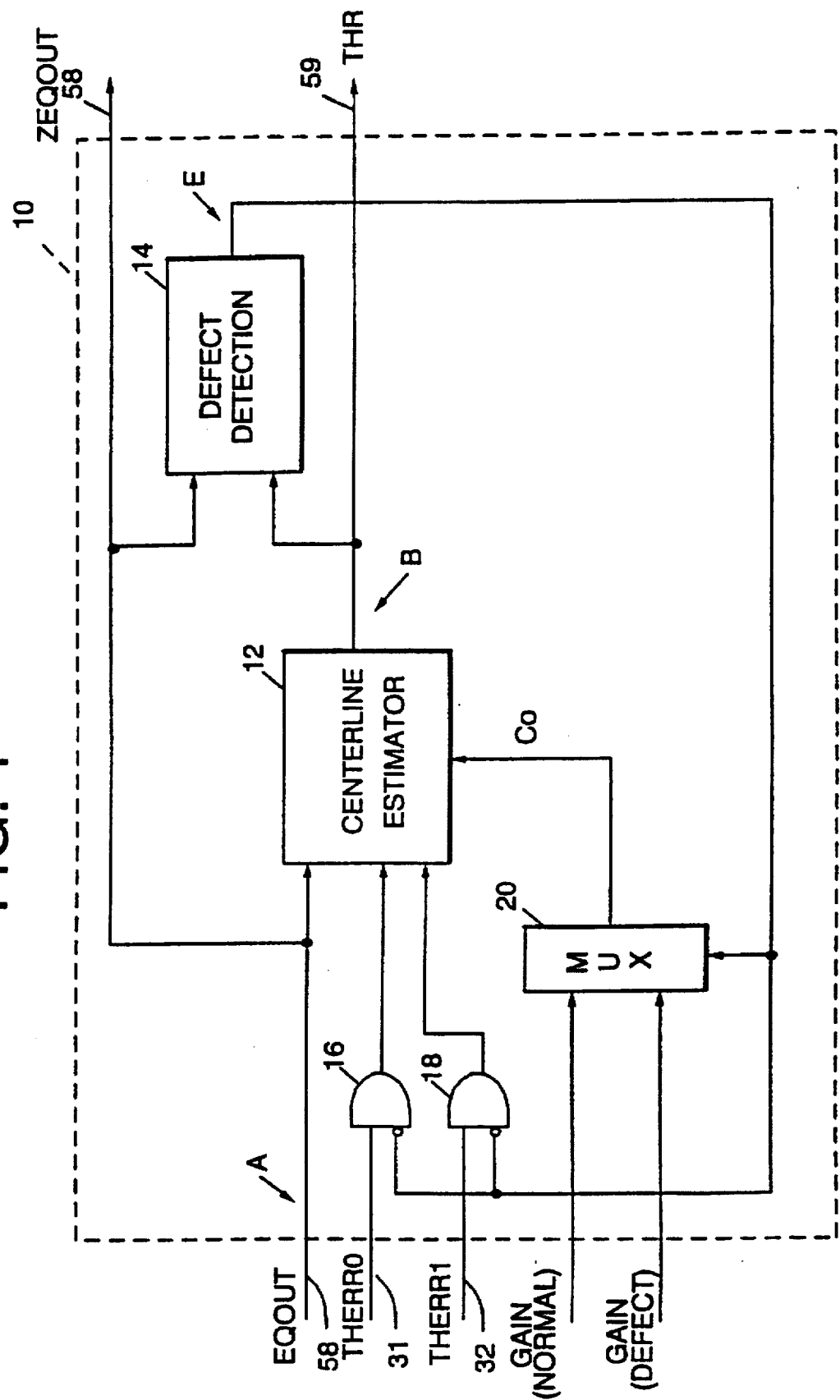
FIG. 1 shows a preferred embodiment of the data-transition threshold tracking network implemented in accordance with the invention.

In FIG. 1, the data-transition threshold following network 10 operates according to the invention to provide the threshold used in data detection circuits (described in the cross-referenced copending application Ser. No. 08/407,124). The data-detection threshold, THR, is near the amplitude mid-point between positive and negative peaks of the read signal. Network 10 is composed of digital circuits rather than analog circuits, and the input/output signals in FIG. 1 are digital values reflecting samples of analog waveforms at a particular sample time.

Centerline estimator 12 monitors the equalized read signal, EQOUT, and produces a data-detection threshold value THR which is an estimate of the amplitude mid-point or centerline of the read signal waveform. Centerline estimator 12 also receives the transition phase errors THERR0 and THERR1 of the read signal waveform from dual phase locked loops (described in the cross-referenced copending application Ser. No. 08/407,124). The transition phase errors are used to provide a more accurate adjustment of the centerline estimate and thus the data-detection threshold, THR. The phase error feedback to the data-transition threshold following network 10 adjusts the threshold to keep the detected transition in the middle of a bit cell interval. However, when a media defect occurs and the threshold THR drifts too far from the amplitude mid-point of a normal read signal, the threshold may lock up far above or far below the amplitude mid-point of a normal read signal. In effect, feedback of the transition phase error can cause the read channel circuits to lock onto the next bit cell and hold the data-transition threshold, THR, at an incorrect value approximately ¾ of the way between the amplitude mid-point of a normal waveform and the peak value of that waveform.

To prevent the transition phase error from locking the threshold THR at the wrong level during a defect, defect detection circuit 14 produces a defect-present signal to control gates 16 and 18. Phase errors THERR0 and THERR1 are each 6 bit digital words. When the defect detector 14 detects that the equalized read signal EQOUT is due to a defect, the detector inhibits gates 16 and 18 from passing transition phase errors THERR0 and THERR1 to the centerline estimator 12. Therefore, the phase errors can not cause the threshold THR to lock at an incorrect value.

In addition to inhibiting the phase error values from reaching the centerline estimator 12, the defect detector also boosts the gain used in the centerline estimator. Changing the gain changes the speed with which the threshold THR follows the mid-point of the signal waveform. If the gain is increased, the THR follows changes more quickly. Therefore, by boosting the gain during a defect detection, threshold THR will more quickly follow the signal waveform and return to the true centerline after the read head (not shown) leaves the area of the defect in the media. As will be described hereinafter with regard to FIGS. 3 and 4, the trailing edge of the detected defect signal is extended past the actual detection of the defect. This extended time permits the centerline estimator 12 to settle at the amplitude mid-point of the read signal without retriggering the defect detector.

The gain applied to centerline estimator 12 is switched between nominal value and defect value (higher gain than nominal) by multiplexing switch 20. When the defect detected signal is low or absent, switch 20 passes the nominal digital gain value to estimator 12. The nominal gain value is set so that the estimator 12 follows the signal waveform as quickly as possible without being sensitive to jitter or noise in the waveform. As a practical matter, this means that the estimator follows the signal waveform slowly when the gain value is nominal. When the defect detected signal is high or present, switch 20 passes the higher, defect gain value to estimator 12.

In summary, the data-transition threshold tracking network uses a centerline estimator to follow amplitude mid-point of the read signal waveform and produce the data-transition threshold THR. To more accurately adjust the estimator's response to changes in the read signal waveform, the digital values of the transition phase errors are applied to increase or decrease the THR value. In the event of a defect being detected, the transition phase error feedback to the centerline estimator is inhibited and the gain of the estimator is boosted. The former prevents the estimator from locking on to an incorrect threshold value. The latter helps the estimator recover to the amplitude mid-point of the read signal after the read head has passed the defect and is reading data on the media again.

Figure 2:
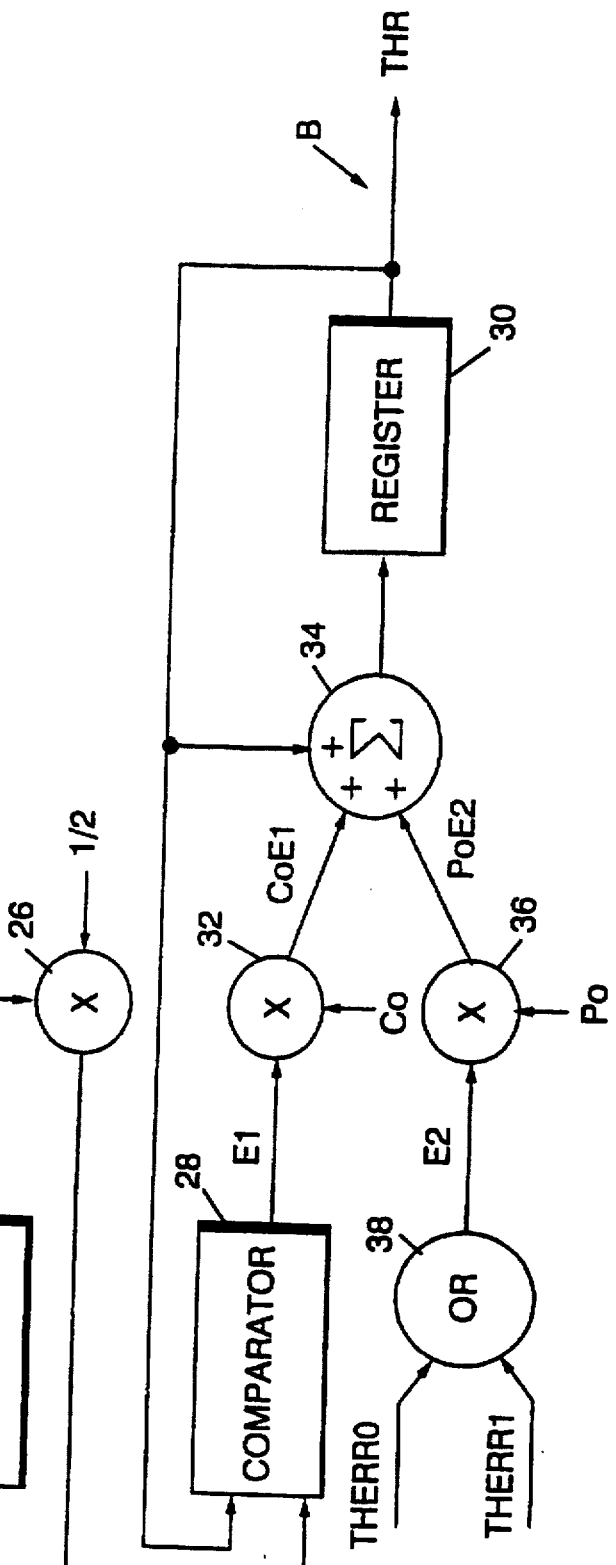
FIG. 2 shows one embodiment of the centerline estimator circuit in FIG. 1.

The centerline estimator of FIG. 1 is shown in detail in FIG. 2. The equalized read signal, EQOUT, is received by the maximum/minimum detector 22. Detector 22 stores the most recent minimum and maximum digital values for the read signal and provides those values to summing circuit 24. One embodiment of detector 22 includes buffer memory or registers to store the most recent maximum and minimum values of the read signal. These buffers would be updated after each PTR or NTR transition. The most recent maximum and minimum values are summed by summing circuit 24. The summed value is multiplied by ½ in the multiplying circuit 26. Summing circuit 24 and multiplying circuit 26 together average the minimum and maximum values of the read signal to produce an amplitude mid-point value for the waveform.

Comparator 28 compares the amplitude mid-point value to a stored value from register 30. This stored value is the data-transition threshold THR value. Comparator 28 produces at its output the difference between the THR value and the amplitude mid-point value. Comparator 28 could just as well be a summing circuit that takes the difference between the amplitude mid-point value and the threshold THR value. This difference is the amplitude mid-point error value E1, and it is multiplied by gain factor $C_0$ in multiplying circuit 32. Gain adjusted amplitude mid-point error Ei*$C_0$ is added to THR value by summing circuit 34 to produce an updated THR value that is loaded into register 30. Gain factor $C_0$ is the nominal gain factor or the defect gain factor as received from switch 20 in FIG. 1 described above.

Summing circuit 34 also receives the transition phase error value THERR0 or THERR1 multiplied by a gain factor $P_0$ in multiplying circuit 36. THERR0 and THERR1 are collected by the OR circuit 38. Since THERR0 is the phase error associated with a positive transition (PTR) and THERR1 is the phase error associated with a negative transition (NTR), they will not occur at the same time. Accordingly, whichever phase error value is present is passed by OR circuit 38 to multiplying circuit 36. The transition phase error value E2 multiplied by the gain factor $P_0$ and the amplitude mid-point error E1 multiplied by the gain factor $C_0$ are added to threshold value by summing circuit 34, i.e. THR+($C_0$*E1)+($P_0$*E2). This updated threshold value is loaded into register 30 and becomes the new data-transition threshold THR value.

In normal operation, THR slowly follows the changes in the amplitude mid-point as reflected in the $C_0$*E1 adjustment. In addition, the phase error at the positive and negative transitions produces a $P_0$*E2 adjustment of THR. As a result, the centerline estimator of FIG. 2 tracks the amplitude mid-point of the read signal waveform based on a $C_0$ factor of the E1 error from amplitude mid-point, and based on the $P_0$ factor of the E2 error from the transition phase error at a PTR or NTR. In normal or nominal operation, $C_0$ gain factor is 0.03, and the $P_0$ gain factor is 2.0. These gain factors are dependent on the performance characteristics of the optical drive using the invention. Higher gain factors are desirable as the circuits will respond faster to changes in the read signal. However, if the gain factors are set too high, the signal to noise ratio at the data detector using the threshold THR value will deteriorate. Accordingly, the optimum gain factors are determined during the testing of the disk drive.

During the presence of defect detected signal, the $C_0$ gain factor is set to 0.152 (about five times greater than the nominal value 0.03) so that the centerline estimator tracks changes in the read signal centerline more rapidly as discussed above. The $P_0$ gain factor during defect detected signal is unchanged since the phase errors are inhibited from reaching the centerline estimator by gates 16 and 18 in FIG. 1. Alternatively, $P_0$ can be set to 0 (zero) to prevent phase error values from reaching summing circuit 34 in FIG. 2.

Figure 3:
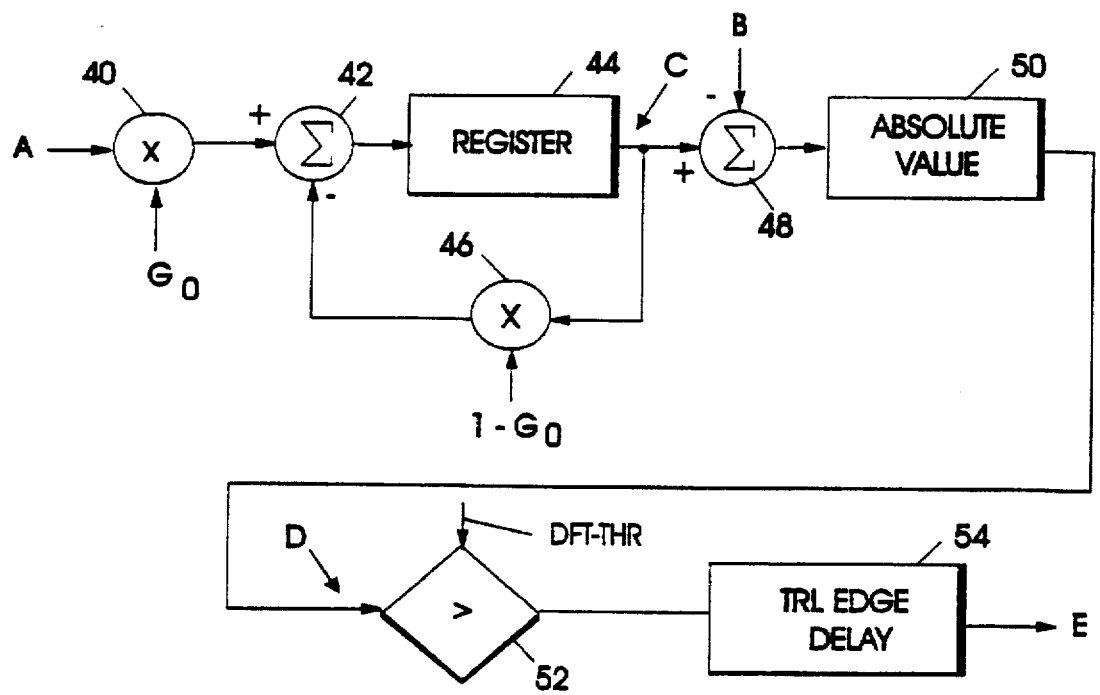
FIG. 3 shows the preferred embodiment of the defect detection circuit shown in FIG. 1.
Figure 4:
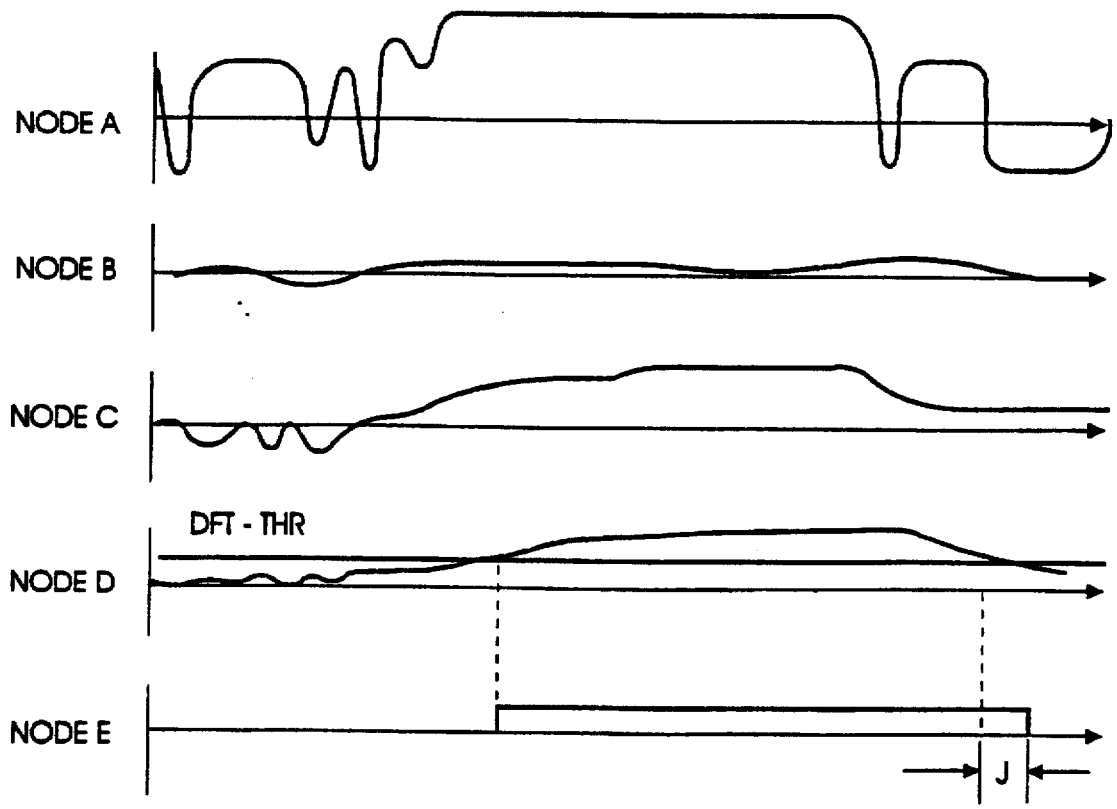
FIG. 4 illustrates examples of waveforms existing at correspondingly labelled nodes in the defect detection circuit of FIG. 3.

The defect detection circuit 14 in FIG. 1 is shown in detail in FIG. 3. The analog waveforms processed in FIG. 3 are shown in FIG. 4. Of course the circuits in FIG. 3, as in the other figures, are digital circuits and are processing sampled digital values of the waveforms in FIG. 4. Read signal A (FIG. 4) is input to multiplying circuit 40. (In an alternative embodiment of the invention, the amplitude mid-point from multiplier 26, rather than the equalized read signal A, is provided to multiplier 40 in FIG. 3.) Circuit 40 multiplies the digital value for A (or the amplitude mid-point value) by the gain factor $G_0$. The gain factor $G_0$ is preferably 1/32. Multiplier 40, summing circuit 42, register 44 and negative feedback through multiply circuit 46 make up a low pass filter. The output of the low pass filter is waveform C which may be viewed substantially as the DC component of the equalized read signal A. More particularly, waveform C is the difference between the maximum and the minimum values of A averaged over time where the time factor depends on the design of the low pass filter. Thus, waveform C is an average centerline value for the read signal.

The difference between the average centerline value (waveform C) and data-detection threshold value (waveform B) is taken by summing circuit 48. Waveform B is the data-detection threshold THR and comes from the centerline estimator 12 (FIG. 1) described in FIG. 2. The digital differences between waveforms B and C are converted to absolute values by circuit 50 to produce waveform D. Waveform D is therefore a measure of the departure of a present amplitude mid-point of the read signal, as indicated by the data detection threshold THR (waveform B), from the average centerline value (waveform C) of the read signal.

Defect-threshold comparator 52 compares D to a defect threshold (dft-thr) to produce the defect present signal E. In other words when D, the departure of the present amplitude mid-point from the average centerline, exceeds the defect threshold (dft-thr), the defect present signal E goes high. When D goes below the dft-thr threshold, E goes low after a delay interval J. The delay interval is provided by trailing edge delay circuit 54. The defect present signal E is the OR'd output of defect threshold detector 52 and trailing edge delay circuit 54.

Circuit 54 is preferably a counter driven by a clock and is the digital equivalent of a single shot triggered by the trailing edge of the binary signal out of defect threshold detector 52. The counter begins counting clock pulses when signal value D goes below the dft-thr threshold value and counts for a time interval J. The time interval J in the preferred embodiment is about 24 bit cells. The interval should be long enough to allow the centerline estimator to reacquire the true centerline after the read transducer has moved past the defect, i.e. the defect on recording surface is no longer distorting the read signal.

While a number of preferred embodiments of the invention have been shown and described, it will be appreciated by one skilled in the art, that a number of further variations or modifications may be made without departing from the spirit and scope of our invention.

What is claimed is:

1. In an optical disk drive using pulse width modulated recording, circuitry for tracking a data-detection threshold to a centerline value of a read signal fluctuating between variable maximum and minimum values, said circuitry comprising:

an estimating circuit for estimating the centerline of the read signal based on a present amplitude of the read signal and based on a transition phase error in transitions of the read signal between minimum and maximum values, said estimating circuit providing a centerline estimated value as a data detection threshold value; and said estimating circuit comprises:

an averaging circuit for averaging a most recent maximum value with a most recent minimum value to produce a present amplitude mid-point value;

a difference circuit for taking the difference between the present amplitude mid-point value and the data-detection threshold value and providing an amplitude mid-point error value;

a combining circuit for updating the data-detection threshold value with the amplitude mid-point error value and a transition phase error value from a most recent data-transition to produce an updated data-detection threshold value.

2. The circuitry of claim 1 and in addition:

a defect detector circuit for detecting departure of an average centerline value of the read signal from the data detection threshold value and producing a defect present signal as long as the departure is greater than a predetermined amount;

gating circuits responsive to said defect detected signal for inhibiting the transition phase error value from reaching said combining circuit; and a gain circuit responsive to said defect present signal for boosting the amplitude mid-point error value provided to said combining circuit.

3. The circuity of claim 2 wherein said defect detector circuit comprises:

a low pass filter for passing a low frequency component derived from the read signal and providing an average centerline value;

a difference circuit taking the difference between the data detection threshold value and the average centerline value to produce a departure value indicative of the difference between the average centerline of the read signal and the data- detection threshold;

a comparator circuit for detecting the departure value is greater than a departure threshold value and producing the defect present signal.

4. The circuitry of claim 3 and wherein said defect detector circuit further comprises:

a trailing edge delay circuit for extending the duration of the defect present signal after the departure value falls below the departure threshold value;

said gain circuit boosts the amplitude mid-point error value during the extended duration of the defect detected signal;

said gating circuits inhibit the transition phase error from reaching the combining circuit during the extended duration of the defect present signal; and said estimating circuit settles the data-detection threshold at the centerline estimated value without retriggering the defect detector circuit.

5. In an optical disk drive using pulse width modulated recording, a method for tracking a data-detection threshold to a centerline value of a read signal fluctuating between variable maximum and minimum values, said method comprising the steps of:

averaging a most recent maximum value of the read signal with a most recent minimum value of the read signal to produce a present amplitude mid-point value;

summing the difference between the present amplitude mid-point value and the data-detection threshold value and providing an amplitude mid-point error value;

updating the data-detection threshold value with the amplitude mid-point error value and a transition phase error value from a most recent data-transition to produce an updated data-detection threshold value.

6. The method of claim 5 further comprising the steps of:

detecting departure of an average centerline value of the read signal from the data-detection threshold value and producing a defect present signal as long as the departure is greater than a predetermined amount;

inhibiting said updating step from updating the data-transition threshold with the transition phase error during the duration of the defect present signal; and boosting the amplitude mid-point error value used in the updating step during the duration of the defect present signal.

7. The method of claim 6 wherein said detecting step comprises the steps of:

averaging the value of the read signal and providing an average centerline value for the read signal;

summing the difference between the data detection threshold value and the average centerline value to produce a departure value indicative of the difference between the average centerline of the read signal and the data-detection threshold;

detecting the departure value is greater than a departure threshold value and producing, the defect present signal.

8. The method of claim 7 further comprising the steps of:

extending the duration of the defect present signal after the departure value falls below the departure threshold value whereby the data-detection threshold settles at the centerline estimated value.

* * * * *